United States Patent [19]

Budecker et al.

[11] Patent Number: 4,807,945
[45] Date of Patent: Feb. 28, 1989

[54] HYDRAULIC BRAKE SYSTEM FOR MOTOR VEHICLES

[75] Inventors: Ludwig Budecker, Frankfurt am Main; Anton David, Goetzenhain; Georg Obersteiner, Koenigstein; Ulrich Zutt, Niedernhausen; Hans-Albrecht Guse, Bad Homburg, all of Fed. Rep. of Germany

[73] Assignee: Alfred Teves GmbH, Frankfurt am Main, Fed. Rep. of Germany

[21] Appl. No.: 84,256

[22] Filed: Aug. 10, 1987

[30] Foreign Application Priority Data

Aug. 12, 1986 [DE] Fed. Rep. of Germany ....... 3627264

[51] Int. Cl.[4] .............. B60T 8/32; B60T 13/12
[52] U.S. Cl. ...................... 303/114; 303/87; 303/116
[58] Field of Search ........... 137/543.15, 540; 303/114, 113, 116, 87; 267/64.23, 64.27; 138/30

[56] References Cited

U.S. PATENT DOCUMENTS

| 3,994,534 | 11/1976 | Wilson | 303/113 |
| 4,580,847 | 4/1986 | Burgdorf | 303/114 |
| 4,615,320 | 10/1986 | Fehrenbach et al. | 138/30 |
| 4,643,487 | 2/1987 | Neubrand | 303/114 |

FOREIGN PATENT DOCUMENTS 2147962 5/1985 United Kingdom ............ 303/87

Primary Examiner—Andres Kashnikow
Assistant Examiner—Mark T. Le
Attorney, Agent, or Firm—James B. Raden

[57] ABSTRACT

In a hydraulic motor vehicle brake system with slip control comprising a pressure accumulator (13), a hydraulic pump (23), a non-return valve (2) and a brake power booster (17). The pressure outlet of the pump (23) is connected with the pressure accumulator and with an inlet of the brake power booster (17) via the non-return valve (2). The outlet side of the non-return valve (2) is connected with the inlet of the brake power booster (17) via the pressure accumulator (13) in order to reduce noises caused by pressure pulsations in the fluid flow of the pump (23).

3 Claims, 3 Drawing Sheets

HYDRAULIC BRAKE SYSTEM FOR MOTOR VEHICLES

BACKGROUND OF THE INVENTION

The present invention relates to a slip-controlled motor vehicle brake system comprising a pressure accumulator, a hydraulic pump, a non-return valve and a brake power booster. The pressure outlet of the pump is connected with the pressure accumulator via the non-return valve.

In a brake system of this type, see for example, U.S. Pat. No. 4,634,190, noises are generated by pressure pulsations of the fluid flow leaving the pump. These noises and pulsations can be sensed in the interior of the vehicle and are usually felt to be unpleasant.

SUMMARY OF THE INVENTION

It is the object of the present invention to create a motor vehicle brake system of the aforementioned type, wherein the noises generated by the pressure pulsations of the fluid flow leaving the pump are reduced.

According to the invention, this object is achieved in that the outlet side of the non-return valve is connected with the inlet of the brake power booster via the pressure accumulator. In this way, the fluid flow from the pump is no longer transmitted directly to the inlet of the brake power booster. It is transmitted first to the pressure accumulator so that pressure pulsations and the noises connected therewith are attenuated because of the calming down of the fluid flow in the pressure accumulator.

Preferably it is provided that the connecting piece of the pressure accumulator accommodates a tube with a clearance between the tube and the connecting piece. The tube communicates with one of the two connecting channels one of which connects the outlet side of the non-return valve and, the other of which connects the inlet side of the brake power booster with the pressure accumulator. The clearance between the connecting piece and the tube communicates with the other of the two connecting channels. In this manner, the connecting piece of the pressure accumulator can be used both to transmit the fluid flow from the pump to the pressure accumulator and to transmit the pressure from the pressure accumulator to the brake power booster without a mutual impairment of the inlet and utlet flows of the pressure accumulator occurring. The tube may be integral with the non-return valve to provide a compact design.

In an improvement the valve closure member of the non-return valve is displaceable in a housing bore forming a valve seat such that it is sealed relative to said housing bore and is provided with at least one bore, preferably a radial bore, connecting an intermediate chamber arranged between the housing bore and the valve closure member with an axial bore arranged in the valve closure member. The axial bore continues in the tube which is integral with the valve closure member. The free end of the tube projects into the accumulating chamber of the pressure accumulator when the non-return valve is open, and is retracted from the accumulating chamber, at least up to the opening edge of the connecting piece of the pressure accumulator. This opening edge adjoins the accumulating chamber of the pressure accumulator when the non-return valve is closed. This embodiment ensures that during the charging of the pressure accumulator, the tube is always projecting into the latter so that an optimum noise reduction is achieved. however, when the non-return valve is closed, the tube does not project into the pressure accumulator, thus preventing possible damage to a diaphragm provided in the accumulator.

In another embodiment the valve closure member of the non-return valve is displaceably guided in a bore of a valve seat member which is inserted in a housing bore such that is sealed relative to the latter. The first-mentioned bore forms a valve seat and continues in the tube which is tightly connected with the valve seat member and the free end of the tube reaches almost up to the opening edge of the connecting piece of the pressure accumulator. This opening edge adjoins the accumulating chamber of the pressure accumulator. With this embodiment a compact design is achieved wherein the tube will not damage the diaphragm in the pressure accumulator and will be solely held in its installation position by means of the valve seat member.

The tube is preferably made of metal, preferably steel. When this tube material is chosen, a further improvement of the noise attenuation is achieved.

In a further embodiment the tube is provided on one end with a radial flange abutting on the inside of the wall of the pressure accumulator, and, on its portion penetrating the connecting piece of the pressure accumulator with axial guide ribs confining channels extending from the flange. On the end of the tube section penetrating the connecting piece, which end protrudes from the connecting piece, there are provided snap-in noses which radially jut out and which can be moved together with the tube from the inside of the pressure accumulator through the latter's connecting piece while being deformed elastically. The other end of the tube, i.e., the end that protrudes from the connecting piece, is sealed relative to a housing bore accommodating the non-return valve. In this embodiment, the tube is integrated in the pressure accumulator and is held by the latter in its installation position.

In addition, a throttle may be provided and is arranged in a pressure channel branching off a connecting channel arranged between the pressure accumulator and the brake power booster and leading to a pressure switch. This throttle separates the chamber arranged between the latter and the pressure switch from the pressure outlet of the pump to a large extent and thus brings about an attenuation of vibrations which could be otherwise transmitted to the pressure switch which switch comprises parts, such as spring and piston, which could be excited by vibrations and generate noises.

BRIEF DESCRIPTION OF THE DRAWING

The present invention and its improvements will be described in more detail in the following description taken in conjunction with the accompanying drawings in which.

DETAILED DESCRIPTION OF PREFERRED EMBODIMENTS

Figure 1:
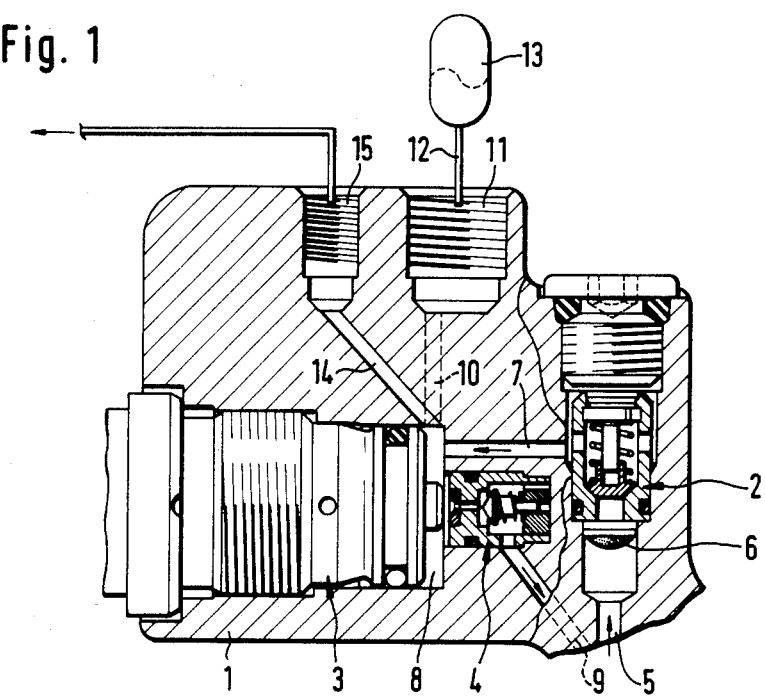
FIG. 1 is a partial section view of a part of a known motor vehicle brake system.

The part of a known brake system illustrated in FIG. 1 is accommodated in a part of a housing 1 of a radial piston pump (not illustrated). It includes a non-return valve 2, a pressure switch 3 and a pressure relief valve 4. An outlet channel 5 of the radial piston pump communicates with the suction side of the radial piston pump via a filter 6, the non-return valve 2 and a connecting channel 7 located adjacent the outlet side of the non-return valve 2, a pressure chamber 8 arranged on the inlet side of the pressure switch 3, the pressure relief valve 4 and a connecting channel 9 located on the outlet side of the pressure relief valve 4. The contact of the pressure switch is situated in the operating circuit of the drive motor of the radial piston pump, and on the inlet side of the pressure relief valve 4. The pressure chamber 8 in addition, communicates with a connecting bore 11 for the connecting piece 12 of a pressure accumulator 13 via a connecting channel 10 and also with a connecting bore 15 for a brake power booster (not shown in FIG. 1) via a connecting channel 14.

The pulsating fluid flow from the radial piston pump acts directly onto the inlet side of the brake power booster via the non-return valve 2 and the connecting channels 7, 14. Although the pressure pulsations are slightly attenuated by the pressure accumulator 13 which is also connected to the pressure chamber 8, the noise level caused by the pressure pulsations of the radial piston pump is still relatively high.

Figure 2:
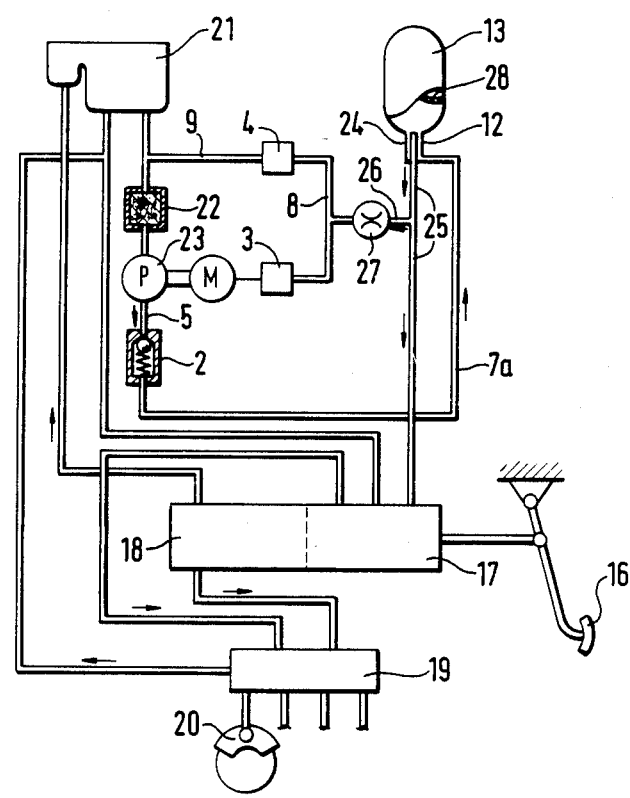
FIG. 2 shows a block diagram of a motor vehicle brake system with slip control according to the invention.

FIG. 2 shows a schematic illustration of a motor vehicle brake system with slip control according to the invention, wherein the noises generated by the pressure pulsations of the radial piston pump are attenuated even further.

Figure 4:
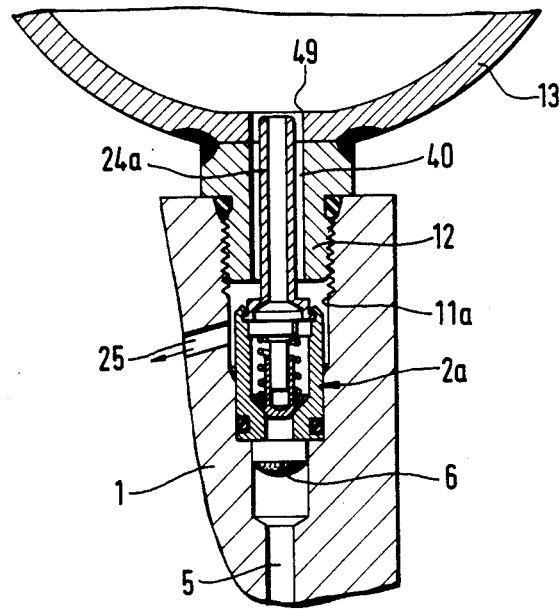
FIG. 4 shows a variation of the part of the brake system illustrated in FIG. 3.

The motor vehicle brake system according to FIG. 2 has, in principle, the same design as the motor vehicle brake system according to FIG. 4 of U.S. Pat. No. 4,634,190 so that it will only be briefly described herein. It comprises a brake pedal 16 and an associated brake power booster 17 with integral master cylinder 18. A switching valve arrangement 19, electronically controllable in dependence upon a slip occurring during braking, is connected to the four wheel brakes. Only one wheel brake 20 is illustrated. At first, the hydraulic pressure fluid is transmitted from a return reservoir 21 into the pressure accumulator 13 via a filter 22, a radial piston pump 23, the connecting channel 5, the non-return valve 2, a connecting channel 7a and the connecting piece 12. The pressure fluid is then transmitted directly from the pressure accumulator 13 to the inlet of the brake power booster 17 via a tube 24 accommodated in the connecting piece 12 of the pressure accumulator 13 and via a connecting channel 25 following the tube 24. Another connecting channel 26 branches off from the connecting channel 25 includes a throttle 27 and leads to the pressure side of the pressure switch 3 and the pressure relief valve 4.

The pulsating fluid flow from the radial piston pump 23 is, therefore, at first transmitted directly into the pressure accumulator 13 so that the fluid flow leaving the pressure accumulator 13 via the tube 24 and the connecting channel 25 is to a large extent free from pressure pulsations. The pressure pulsations can thus not be transmitted via the brake power booster and the chassis into the interior of the motor vehicle and cannot generate noises there.

The throttle 27, shaped in the form of an orifice plate, brings about a further attenuation of pressure pulsations which may still exist so that vibratory parts such as springs and closure members accommodated in the pressure switch 3 and the pressure relief valve 4 are not excited to vibrate and generate noises.

The free end of the tube 24 does not protrude into the interior of the pressure accumulator 13 and, accordingly, the diaphragm 28 located in the pressure accumulator 13 cannot be damaged by the tube 24. The tube 24 is preferably made of metal, in particular steel. Using this material, an effective sound absorption is achieved.

Figure 3:
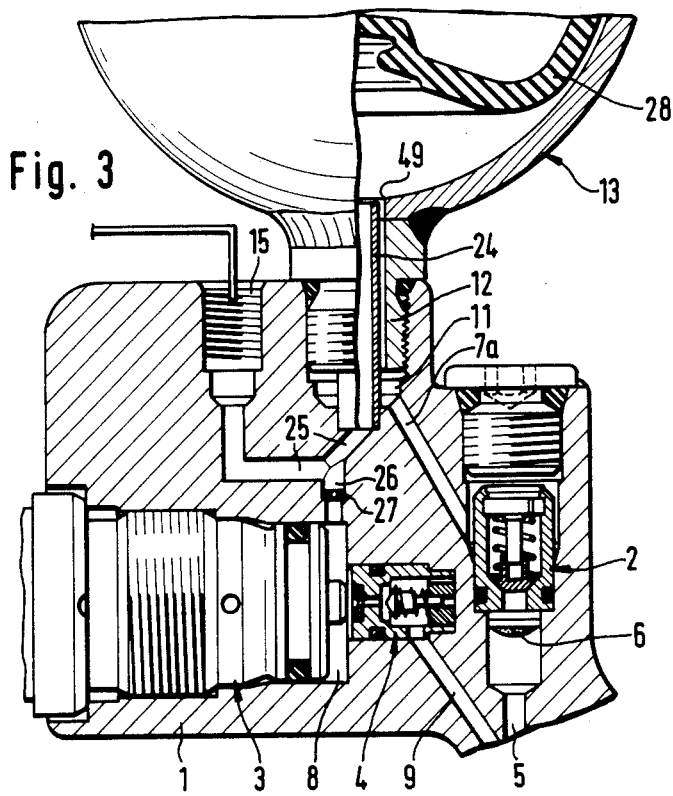
FIG. 3 shows a more detailed illustration of a part of the brake system shown in FIG. 2.

FIG. 3 shows a specific embodiment of the part of the brake system according to FIG. 2 which part is important in the invention. Like reference numerals have been used for like parts of FIGS. 1 to 3 so that a detailed description of FIG. 3 will be unnecessary. In the variation according to FIG. 4, the tube 24a and the non-return valve 29 are of integral design and the connecting piece 12 as well as the non-return valve 2a are arranged in a common connecting bore 11a. An additional bore, such as 7a, for the non-return valve 2a thus becomes superfluous.

Figure 5:
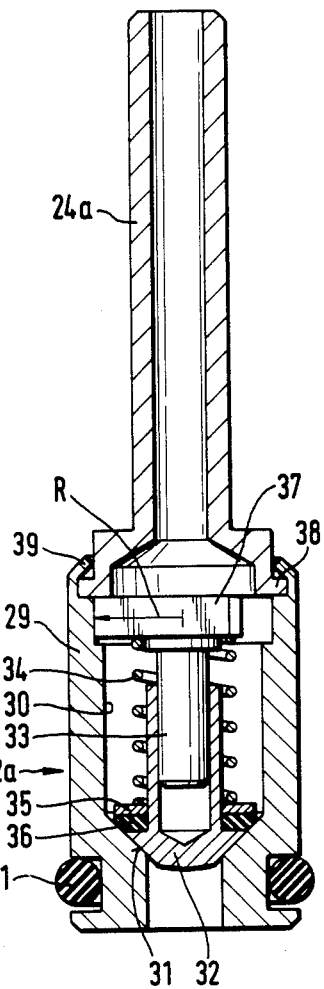
FIG. 5 is an enlarged view of the non-return valve and attached tube shown in FIG. 4.
Figure 6:
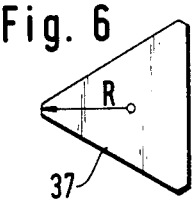
FIG. 6 shows a top view of the triangular head of a guide pin provided in the non-return valve according to FIGS. 4 and 5.

FIGS. 5 and 6 show a detailed and enlarged illustration of the non-return valve 2a and its connection with the tube 24a. A valve seat member 29 is sealedly inserted in the connecting bore 11a, leading wherefrom is the connecting channel 25. The valve seat member 29 is formed with a stepped bore 30 forming a conical valve seat 31. In the bore 30, a mushroom-shaped valve closure member 32 is axially and displaceably received on a pin 33 in opposition to the force of a spring 34 which bears, on the one hand, against the head of the valve closure member 32 through the intermediary of annular discs 35 and 36 made of metal and/or rubber and, on the other hand, against a triangular head 37 of the pin 33. The tube 24a is provided with a flange 38 which extends radially outwardly and bears against a step of the bore 30. Around the flange 38 a flange portion 39 of the valve seat member 29 is bent in order to tightly connect the valve seat member 29 with the tube 24a. As best seen in FIG. 6, the head 37 has rounded corners having a radius R. These rounded corners abut on a step of the bore 30 and this step has the same radius R. In addition, the pin 33 abuts on the flange 38 and is thus secured both axially and radially.

When the non-return valve 2a is open, the valve closure member 32 lifts off the valve seat 31 and the fluid flowing out of the radial piston pump 23 can be transmitted through the bore 30 past the head 37 of the pin 33 through the tube 24a into the pressure accumulator 13. The pressure fluid is then transmitted from the pressure accumulator 13 into the connecting channel 25 via the annular chamber 40 (FIG. 4) and the housing bore 11a. An annular seal 41 (FIG. 5) ensures a sealing of the valve seat member 29 relative to the housing bore 11a.

Figure 7:
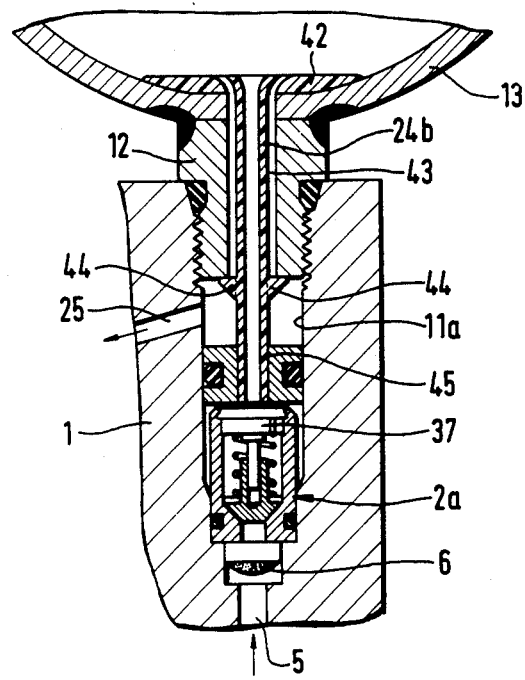
FIG. 7 is a sectional view of another variation of the part of the brake system shown in FIG. 3.

In the variation according to FIG. 7, the tube 24b is provided on one end with a radial flange 42 abutting on the inside of the wall of the pressure accumulator 13. On its portion penetrating the connecting piece 12 of the pressure accumulator 13, the tube 24b is provided with axial guide ribs 43 confining channels protruding through the flange 42. On the end of the tube section penetrating the connecting piece, which end protrudes from the connecting piece 12, the tube is provided with snap-in noses 44 which radially jut out and which can be moved together with the tube 24b from the inside of the pressure accumulator 13 through the latter's connecting piece 12 while being deformed elastically. The lower surface (as viewed in FIG. 7) of the snap-in noses 44 are conical to facilitate their deformation. Although not shown in the drawing, the noses 44 are aligned with the ribs 43 so that the channels extend between the accumulator 13 and the housing bore 11a. The other end of the tube protruding from the connecting piece 12 is pressed into a sleeve 45 which is sealed relative to the housing bore 11a accommodating the non-return valve 2a by means of an annular seal 46. The tube 24b is made of a plastic material and is separated from the non-return valve 2a. Just as is the case in the embodiment according to FIGS. 4 to 6, the fluid is thus transmitted from the radial piston pump via the non-return valve 2a through the interior of the tube 24b into the pressure accumulator and from there, after an attenuation of the pressure pulsations, to the brake power booster via the channels arranged between the guide ribs 43, via the housing bore 11a and the connecting channel 25. The tube 24b is secured in its axial and in its radial position by means of the pressure accumulator 13 and flange 42 as well as the connecting piece 12 and noses 44.

Figure 8:
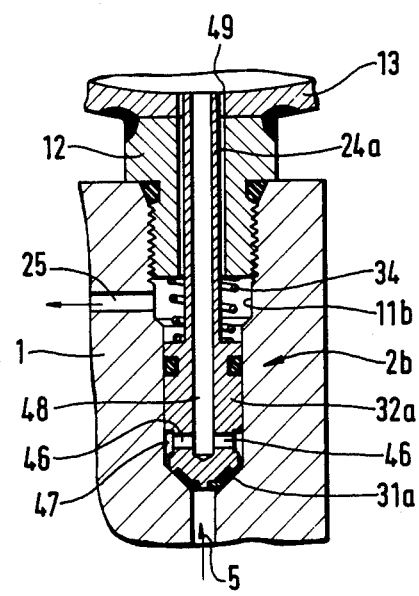
FIG. 8 is a sectional view of a third variation of the part of the brake system show in FIG. 2.

In the variation according to FIG. 8, the valve closure member 32a of the non-return valve 2b is displaceable in a housing bore 11b forming the valve seat 31a such that it is sealed relative to said housing bore and is provided with two radial bores 46 connecting an intermediate chamber 47 arranged between the housing bore 11b and the valve closure member 32a with an axial bore 48 formed in the valve closure member 32a. The tube 24a is of integral design with the valve closure member 32a, and the axial bore 48 continues in the tube 24a. When the non-return valve 2b is open, the free end of the tube 24a projects into the accumulating chamber of the pressure accumulator 13, and when the non-return valve 2b is closed, said end is retracted from the accumulating chamber, at least up to the opening edge 49 of the connecting piece 12 of the pressure accumulator 13, which opening edge adjoins the accumulating chamber of the pressure accumulator 13.

Since in this case, the housing 1 and/or the housing bore 11b form the valve seat 31b, a separate valve seat member is not required. The spring 34 bears against the connecting piece 12, and the pin 33 provided in the embodiments according to FIGS. 4 to 7 becomes also superfluous.

During the charging operation, the tube 24a projects into the pressure accumulator 13 so that an optimum noise reduction is achieved. When the non-return valve 2b is closed, the tube 24a is slightly retracted from the opening edge 49 of the pressure accumulator 13 so that the accumulator diaphragm 28 (see FIG. 3) cannot be damaged.

What is claimed is:

1. Hydraulic motor vehicle brake system with slip control comprising a pressure accumulator, a hydraulic pump, a non-return valve and a brake power booster, the pressure outlet of the pump being connected with the pressure accumulator and with an inlet of the brake power booster via the non-return valve, the outlet side of the non-return valve being connected with the inlet of the brake power booster via the pressure accumulator, wherein the pressure accumulator includes a connecting piece that accommodates a tube with a clearance between itself and the connecting piece, the tube communicates with one of two connecting channels, one of which connects the outlet side of the non-return valve with the pressure accumulator and the other of which connects the inlet side of the brake power booster with the pressure accumulator, the clearance between the connecting piece and the tube communicates with the other of the two connecting channels, wherein the tube is integrally formed with the non-return valve, and wherein the non-return valve includes a valve closure member and a valve seat, the valve closure member being displaceable in a housing bore in which the valve seat is formed, said valve closure member being sealed relative to said housing bore and being provided with at least one bore connecting an intermediate chamber formed between the housing bore and the valve closure member with an axial bore arranged in the valve closure member, the tube and the valve closure member being integral, the axial bore extending through the tube, the free end of the tube projecting into the accumulating chamber of the pressure accumulator when the non-return valve is open, and being retracted from the accumulating chamber, at least up to the opening edge of the connecting piece of the pressure accumulator, which opening edge adjoins the accumulating chamber of the pressure accumulator when the non-return valve is closed.

2. Hydraulic motor vehicle brake system with slip control comprising a pressure accumulator, a hydraulic pump, a non-return valve and a brake power booster, the pressure outlet of the pump being connected with the pressure accumulator and with an inlet of the brake power booster via the non-return valve, the outlet side of the non-return valve being connected with the inlet of the brake power booster via the pressure accumulator, wherein the pressure accumulator includes a connecting piece that accommodates a tube with a clearance between itself and the connecting piece, the tube communicates with one of two connecting channels, one of which connects the outlet side of the non-return valve with the pressure accumulator and the other of which connects the inlet side of the brake power booster with the pressure accumulator, the clearance between the connecting piece and the tube communicates with the other of the two connecting channels, wherein the tube is integrally formed with the non-return valve, and wherein the non-return valve includes a valve closure member and a valve seat formed on a valve seat member, the valve closure member being displaceably guided in a bore of the valve seat member, the valve seat member being inserted in a housing bore such that it is sealed relative to the latter, said bore being formed with the valve seat and continuing in the tube which is tightly connected with the valve seat member, the free end of the tube reaches almost up to the opening edge of the connecting piece of the pressure accumulator, the opening edge adjoining the accumulating chamber of the pressure accumulator.

3. Hydraulic motor vehicle brake system with slip control comprising a pressure accumulator, a hydraulic pump, a non-return valve and a brake power booster, the pressure outlet of the pump being connected with the pressure accumulator and with an inlet of the brake power booster via the non-return valve, the outlet side of the non-return valve being connected with the inlet of the brake power booster via the pressure accumulator, wherein the pressure accumulator includes a connecting piece that accommodates a tube with a clearance between itself and the connecting piece, the tube communicates with one of two connecting channels, one of which connects the outlet side of the non-return valve with the pressure accumulator and the other of which connects the inlet side of the brake power booster with the pressure accumulator, the clearance between the connecting piece and the tube communicates with the other of the two connecting channels, wherein the tube is integrally formed with the non-return valve, and wherein the tube is provided on one end with a radial flange abutting on the inside of the wall of the pressure accumulator, the portion of the tube penetrating the connecting piece of the pressure accumulator being formed with axial guide ribs confining channels formed on the flange, the end of the tube section penetrating the connecting piece protruding from the connecting piece and being formed with snap-in noses which radially jut out, the snap-in noses being moveable together with the tube from the inside of the pressure accumulator through the latter's connecting piece while being deformed elastically, the other end of the tube protrudes from the connecting piece and is sealed relative to a housing bore accommodating the non-return valve.

* * * * *